May 20, 1952     G. G. HYDE     2,597,000
METAL RECTIFIER BRIDGE
Filed Sept. 24, 1945
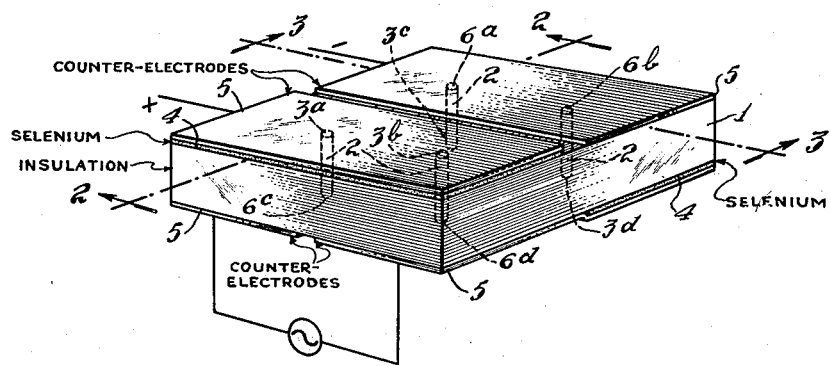
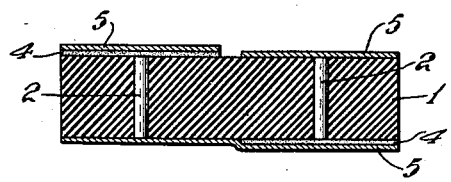
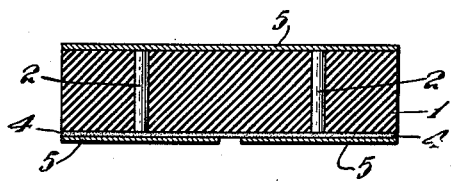
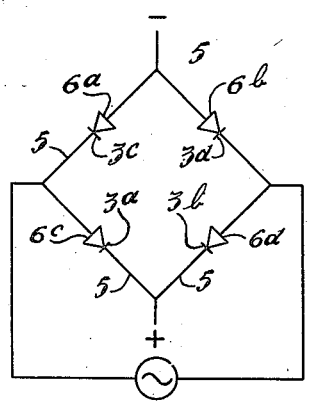
INVENTOR.
George G. Hyde
BY
ATTORNEY Patented May 20, 1952

2,597,000

UNITED STATES PATENT OFFICE 2,597,000

METAL RECTIFIER BRIDGE

George G. Hyde, Greenwood Lake, N. Y., assignor to Federal Telephone and Radio Corporation, New York, N. Y., a corporation of Delaware Application September 24, 1945, Serial No. 618,325

14 Claims. (Cl. 175—366)

1

This invention relates to metal rectifier bridges and particularly to a unitary full wave rectifier bridge construction of the type in which the rectifier elements are mounted in a body of insulating material with surfaces exposed in position for convenient interconnection to form the bridge circuit. The invention is an improvement on the arrangement disclosed in the application of Mortimer C. Bloom for improvements in Metal Rectifier Bridge, filed September 24, 1945, Ser. No. 618,337, now Patent No. 2,459,787.

A purpose of the invention is to provide a rectifier bridge of the indicated type in which the rectifier elements are arranged in an improved manner. The arrangement is particularly designed to facilitate ready and efficient manufacture of rectifier bridges in quantity, and includes a convenient location of the faces of the rectifier elements which are to be interconnected. In particular, these faces are located so that rectifying and conducting layers may readily be applied by standard methods, which may utilize continuous conveyor systems and the like.

Another purpose is to provide a construction of the indicated type in which the body and conducting base portions of the rectifier elements forming the bridge may be produced as a rod or block, and individual bridges may be constructed from sections cut from such rod or block.

Other objects and advantages will appear from the following description, considered in connection with the accompanying drawing, in which Fig. 1 is a perspective view of a rectifier bridge construction embodying the invention;

Fig. 2 is a transverse sectional view on line 2—2 of Fig. 1;

Fig. 3 is a transverse sectional view on line 3—3 of Fig. 1; and

Fig. 4 is a rectifier bridge diagram showing the connections of the rectifier elements.

The invention includes a rectifier bridge unit in which four transversely aligned rectifier elements are mounted by means of an insulating body to form a unitary structure with the four elements arranged around a common axis. Each rectifying element includes a conducting member having a conducting face and an opposite face, referred to herein as the rectifying face, which carries the rectifying layer, such as selenium, and a counter-electrode. The rectifying elements are arranged with the rectifying faces of one adjacent pair located on the opposite side of the unit from the rectifying faces of the other pair; and by providing two conductors on one side of the unit each connected to a conducting face and an adjacent rectifying face, adapted for connection to the source of current, and two conductors on the opposite side of the unit, one connected to the two rectifying faces and the other to the two conducting faces, and constituting the positive and negative connections for the direct current circuit, a simple unitary bridge construction is formed.

A simple embodiment of this type of construction is illustrated in the drawings. It includes an insulating body 1 in which four rectifier elements 2 are embedded with their opposite ends exposed at opposite faces of the body 1. The body may be formed of any suitable insulating material, preferably one which may be rendered plastic for convenience in introducing the elements 2. Glass or synthetic resins of the thermosetting type and having suitable insulating properties and adequate resistance to the heat and pressure conditions involved in making the bridge may be employed, such as resins known by the trade-marks "Bakelite," "Durez" and "Plaskon" of appropriate grades. The rectifier elements 2 are made of conducting metal such as steel or aluminum, and in the illustrated embodiment are in the form of short rods or wires arranged with their opposite ends flush with opposite surfaces of the rectangular body 1.

The rods 2 are parallel and arranged in a rectangle. The rectifying layer, which advantageously is constituted substantially of selenium, is applied to the upper rectifying faces 3a and 3b of the front pair of rods 2 as seen in Fig. 1 and to the lower rectifying faces 3c and 3d of the rear pair of rods 2. This is conveniently accomplished by applying a single layer 4 of selenium across each of said pairs of rectifying faces and the adjacent portions of the surface of body 1. The selenium may be applied in any of the standard ways, including melting, fuming, electro-plating, and the pressed powder method, suitable masks being used if necessary to restrict the selenium to the desired areas. The body 1 will of course be made of material which will stand the temperatures and pressures incident to the application and treatment of selenium by the selected method.

Layers 5 of conducting metal serving as counter-electrodes when located over the selenium layers 4 are applied in parallel strips on both sides of the unit, each strip extending over a pair of ends of the rectifier elements 2, the strips on one side of the unit being at right angles to the strips on the other side. With this arrangement one of the upper strips, as illustrated in Fig. 1, will serve as a counter-electrode overlying the rectifying faces 3a and 3b, while the other strip will serve as a conductor connecting the conducting faces 6a and 6b. One of the lower conducting strips 5 will overlie the selenium layer 4 at rectifying face 3c and will engage conducting face 6c, while the other bottom strip will similarly overlie rectifying face 3d and engage conducting face 6d. The conducting strips 5 are spaced from each other and therefore constitute insulated conductors.

Connecting the two lower strips 5 across a source of alternating current, the upper rear strip 5 will be the negative junction and the upper front strip 5 the positive junction of the bridge. The connections are clearly indicated on the diagram, Fig. 4.

The arrangement of the selenium layers and the conducting strips as described is particularly advantageous and convenient for mass production of the bridges, since both the selenium layers and the conducting strips can be applied by identical operations on opposite faces of the body by standard methods, using suitable masks; the unit is adapted for completion by the usual steps, such as heat treatments and electro-forming. Moreover, the arrangement of both the selenium layers and the conducting layers in the form of strips extending completely across the body makes it possible to employ continuous conveyor methods in which a continuous series of bodies is fed to the metal applying and treating stations. The rectangular form of body is especially adapted for this purpose, as it fits in guideways and maintains the alignment.

The illustrated construction is moreover adapted for quantity production of the body portion by simple standard operations. The wires or rods forming the conducting portions of the rectifier elements 2 may be embedded in a continuous rod or bar of insulating material, and the individual bodies 1 can then be formed by making transverse cuts through the rod. This method is particularly advantageous because it provides a fresh slightly roughened surface at each end of each element 2, avoiding at least to some extent the necessity for treating the exposed surfaces by the standard cleaning and roughening steps to secure adequate adhesion of the selenium. The body-forming stock, which may be a rod, bar or block, may be formed by casting or molding, and in smaller types of rectifier, can be extruded.

The thickness of the body and of the layers applied to the body has been exaggerated in the drawings for the purpose of clarifying the illustration; and it will be appreciated that the body 1 may be as thin as is consistent with adequate engagement of the rectifying elements 2 and mechanical strength. Moreover, the conducting bodies of the element 2 may be varied in size to obtain the desired current conducting characteristics; and where higher current capacity is advantageous the cross-section and size of the elements 2 may be increased from the illustrated proportions, and the elements may extend to or through the adjacent margins of the body 1; as long as they are kept out of contact with each other by intervening portions of the body.

While it is considered preferable in most instances to mold the elements 2 into the body 1 and subsequently apply the selenium and counter-electrodes, the elements may be inserted in suitable recesses or holes in the body 1, and the selenium layer and counter-electrode may be applied to the rectifying faces in advance, in which case it is necessary only to apply the conducting strips in order to produce a unitary bridge construction.

While a preferred embodiment of the invention has been illustrated and certain variations have been indicated, other modifications and changes may be made without departing from the invention as set forth in the claims.

What is claimed is:

1. A metal rectifier bridge unit comprising a body of insulating material, four metal rectifier elements each having a rectifying face and an opposite conducting face, said elements being carried by the body with said faces in transverse alignment at opposite sides of the body, and connecting members each connecting a pair of aligned faces, arranged to form a rectifier bridge.

2. A bridge unit as set forth in claim 1 in which the rectifier elements are embedded in the body.

3. A bridge unit as set forth in claim 1 in which the connecting members extend along the surface of the body.

4. A bridge unit as set forth in claim 1 in which the rectifying faces are arranged in pairs at opposite sides of the body, each pair including a rectifying layer common to both rectifying faces.

5. A bridge unit as set forth in claim 1 in which the elements are parallel to each other and arranged in an annular series.

6. A metal rectifier bridge unit comprising a body of insulating material, four metal rectifier elements embedded in the body, each element having a rectifying face flush with one side of the body and a conducting face flush with the opposite side of the body, and connecting members each connecting a pair of faces at one side of the body arranged to form a rectifier bridge, said connecting members extending along a face of the body.

7. A bridge unit as set forth in claim 6 in which the connecting members comprise two parallel members extending along each of said opposite body faces.

8. A metal rectifier bridge unit comprising a body of insulating material, four metal rectifier elements carried by the body and arranged in an annular series, each element having a rectifying face flush with a face of the body and a conducting face flush with an opposite face of the body, the rectifying faces being arranged in adjacent pairs at opposite sides of the body, each pair having a common layer of rectifying material, and a pair of laterally spaced layers of conducting metal on each of said body faces arranged to form a rectifier bridge, the conducting layers on one body face engaging the two rectifying faces and the two conducting faces respectively, and the conducting layers on the opposite body face each engaging a rectifying face and a conducting face, the portions of said conducting layers overlying the conducting faces constituting counter-electrodes.

9. A metal rectifier bridge unit comprising a body of insulating material, four metal rectifier elements, each having a rectifying face and an opposite conducting face and being mounted in said body with one face on one side of said body and the other face on the opposite side of said body, connecting members connecting pairs of faces on one side of the body and connecting members connecting different pairs of faces on the other side of the body.

10. A metal rectifier bridge unit comprising a body of insulating material, four metal rectifier elements, each having a rectifying face and an opposite conducting face and two of said elements being mounted in said body with their rectifying faces on one side of said body and the other two elements being mounted on said body with their rectifying faces on the opposite side of said body and connecting members connected to pairs of like faces on one side of said body and to pairs of unlike faces on the opposite side of said body.

11. The method of making a rectifier bridge unit which comprises forming four metal rectifier elements having rectifying faces and conducting faces, forming a body of insulating material, inserting said elements in said body and with the faces of alternate pairs of elements facing opposite directions and applying spaced layers of conducting material to pairs of faces on one side of said body and to different pairs of faces on the opposite side of said body.

12. The method of making a rectifier bridge unit which comprises forming a body of insulating material with four isolated conductors therein and extending therethrough, applying a rectifying coating to the faces of a pair of conductors on one side of said body and to the faces of the other pair of conductors on the opposite side of the body and thereby forming rectifying faces applying spaced conducting layers to pairs of faces on one side of said body and to different pairs of faces on the opposite side of said body.

13. The method of making a rectifier bridge unit which comprises embedding four elongated metal rectifier base elements in parallel position in an insulating body, cutting said body transversely to the elements to form body sections, applying rectifying coatings to the exposed faces of a pair of elements on one side of said sections and to the exposed faces of a different pair of elements on the opposite side of said sections and thereby forming rectifying faces and applying spaced layers of conducting material to faces of pairs of elements on one side of said sections and to faces of different pairs of elements on the opposite side of said sections.

14. The method of making a rectifier bridge unit which comprises embedding four elongated metal rectifier base elements in parallel position in an insulating body, cutting said body transversely to the elements to form body sections, applying rectifying coatings to the exposed faces of a pair of elements on one side of said sections, applying spaced layers of conducting material to faces of pairs of elements on said one side of said sections, applying rectifying coatings to the exposed faces of a pair of elements different from the pair previously coated and on the opposite side of said sections, and applying spaced layers of conducting material to faces of pairs of elements different from those to which conducting layers have previously been applied and on the opposite side of said sections.

GEORGE G. HYDE.

REFERENCES CITED

The following references are of record in the file of this patent:

UNITED STATES PATENTS

| Number | Name | Date |
|---|---|---|
| 1,745,175 | Lilienfeld | Jan. 28, 1930 |
| 1,898,321 | Strobel | Feb. 21, 1933 |
| 2,189,340 | Donal | Feb. 6, 1940 |
| 2,459,787 | Bloom | Jan. 25, 1949 |

FOREIGN PATENTS

| Number | Country | Date |
|---|---|---|
| 783,646 | France | July 17, 1935 |